US006196584B1

(12) United States Patent
Shirk et al.

(10) Patent No.: US 6,196,584 B1
(45) Date of Patent: Mar. 6, 2001

(54) INITIATOR FOR AIR BAG INFLATOR

(75) Inventors: Bryan W. Shirk, Mesa; Ahmad K. Al-Amin, Higley; Timothy A. Swann; Roy D. Van Wynsberghe, both of Mesa; Jess A. Cuevas, Scottsdale; Thomas H. Deming, Mesa, all of AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/204,005

(22) Filed: Dec. 1, 1998

(51) Int. Cl.[7] .................................................. B60R 21/26
(52) U.S. Cl. ..................... 280/737; 280/741; 102/202.5
(58) Field of Search ........................... 280/737, 741; 137/68.12, 68.13, 74; 102/476, 307, 202, 202.5

(56) References Cited

U.S. PATENT DOCUMENTS

| 3,306,202 | | 2/1967 | Menichelli et al. ............... 102/202.1 |
| 3,420,174 | | 1/1969 | Potter ................................ 102/202.6 |
| 3,822,895 | | 7/1974 | Ochiai ............................... 280/737 |
| 4,216,721 | * | 8/1980 | Marziano et al. .................. 102/306 |
| 4,989,515 | * | 2/1991 | Kelly et al. ....................... 102/202.5 |
| 5,044,282 | * | 9/1991 | Fuchs et al. ...................... 102/475 |
| 5,226,561 | * | 7/1993 | Hamilton et al. .................. 280/737 |
| 5,263,740 | | 11/1993 | Frey et al. ......................... 280/737 |
| 5,344,186 | * | 9/1994 | Bergerson et al. ................. 280/741 |
| 5,348,344 | | 9/1994 | Blumenthal et al. ............... 280/737 |
| 5,403,036 | * | 4/1995 | Zakula et al. ..................... 280/741 |
| 5,468,015 | * | 11/1995 | Goetz ................................ 280/737 |
| 5,518,268 | * | 5/1996 | Moore et al. ...................... 280/737 |
| 5,668,345 | * | 9/1997 | Schroeder et al. ................. 280/741 |
| 5,700,974 | * | 12/1997 | Taylor .............................. 149/109.6 |

* cited by examiner

Primary Examiner—Lanna Mai
Assistant Examiner—Ruth Ilan
(74) Attorney, Agent, or Firm—Tarolli, Sundheim, Covell, Tummino & Szabo L.L.P.

(57) ABSTRACT

An apparatus (10) for inflating an inflatable vehicle occupant protection device (12) comprises a container (14) defining a chamber (40). The container (14) has a portion (36) which is rupturable to form an opening in the container. A quantity of inflation fluid (42) is stored under pressure in the chamber (40). An electrically actuatable initiator (50) is connected with the container (14) for rupturing the rupturable portion (36) of the container to enable flow of inflation fluid (42) out of the inflator (10). The initiator (50) comprises an ignitable primary charge (90) and electrically energizable means (60) for igniting the primary charge. The initiator (50) further comprises a secondary charge (100) ignitable by the primary charge (90). The secondary charge (100) comprises an ignitable metal in solid form which liquefies when ignited by the primary charge (90). The primary charge (90) when ignited generates combustion products under pressure which ignite the secondary charge (100) and direct the liquefied metal into engagement with the rupturable portion (36) of the container (14) to help open the rupturable portion of the container. In a preferred embodiment, the secondary charge (100) is thermite.

10 Claims, 2 Drawing Sheets

INITIATOR FOR AIR BAG INFLATOR

BACKGROUND OF THE INVENTION

Technical Field

The present invention relates to an apparatus for inflating an inflatable vehicle occupant protection device, such as an air bag. In particular, the present invention relates to an initiator for an air bag inflator having a burst disk which is opened by the initiator.

Description of the Prior Art

A known type of inflator for inflating an air bag includes a container in which inflation fluid is stored. The container includes a rupturable burst disk. The inflator also includes an electrically actuatable initiator for, when actuated, rupturing the burst disk to release inflation fluid to flow into the air bag. The initiator typically includes a pyrotechnic material capable of generating combustion products, including hot gases, for rupturing the burst disk. Known initiators use a mixture of a metal and a metallic compound (used as the oxidizer) such as boron potassium nitrate or titanium potassium perchlorate. Ignition of such a charge primarily produces heat, hot gases, and a shock wave for rupturing the burst disk.

SUMMARY OF THE INVENTION

The present invention is an apparatus for inflating an inflatable vehicle occupant protection device. The apparatus comprises a container defining a chamber. The container has a portion which is rupturable to form an opening in the container. A quantity of inflation fluid is stored under pressure in the chamber. The apparatus also comprises an electrically actuatable initiator connected with the container for rupturing the rupturable portion of the container to enable flow of inflation fluid out of the inflator to inflate the protection device. The initiator comprises an ignitable primary charge and electrically energizable means for igniting the primary charge. The initiator further comprises a secondary charge ignitable by the primary charge. The secondary charge comprises an ignitable metal in solid form which liquefies when ignited by the primary charge. The primary charge when ignited generates combustion products under pressure which ignite the secondary charge and direct the liquefied metal into engagement with the rupturable portion of the container to help open the rupturable portion of the container.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF THE PREFERRED EMBODIMENTS

Figure 1:
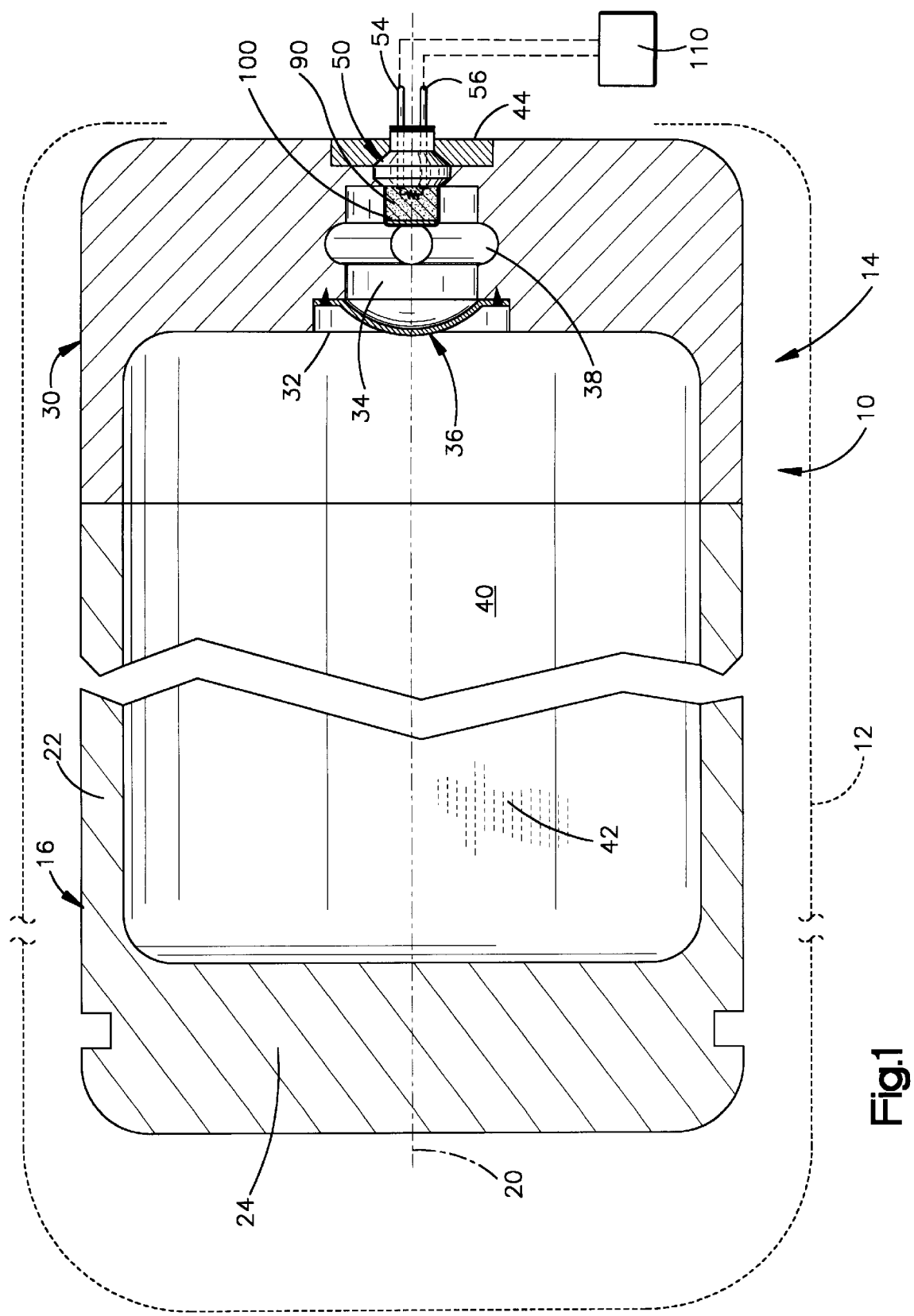
FIG. 1 is a longitudinal sectional view, partially broken away, of an inflator including an initiator constructed in accordance with the present invention.

The present invention relates to an apparatus for inflating an inflatable vehicle occupant protection device, such as an air bag. Other inflatable vehicle occupant protection devices that can be used in accordance with the invention include, for example, inflatable seat belts, inflatable knee bolsters, inflatable head liners or side curtains, and knee bolsters operated by inflatable air bags. In particular, the present invention relates to an air bag inflator having a burst disk which is opened by an initiator. As representative of a first embodiment of the present invention, FIG. 1 illustrates an inflator 10 for inflating an inflatable vehicle occupant protection device, or air bag, illustrated schematically at 12.

The inflator 10 includes a container 14. The container includes a cylindrical main body portion 16 which is centered on an axis 20 of the inflator 10. The main body portion 16 of the container 14 includes a cylindrical, axially extending side wall 22 and a radially extending end wall 24. The container 14 also includes an end cap or diffuser 30 welded to an open end of the main body portion 16 of the container opposite the end wall 24. The diffuser 30 defines an opening 32 into an initiator chamber 34 in the diffuser 30.

The container has a rupturable portion in the form of a burst disk 36. The burst disk 36 is welded to the diffuser 30. A gas outlet opening 38 extends between the initiator chamber 34 and the exterior of the diffuser 30.

The container 14 defines a gas storage chamber 40. A quantity of inflation fluid 42 in the form of a combustible mixture of gases is stored under pressure in the chamber 40. The combustible mixture of gases includes primary gas and fuel gas. The fuel gas provides heat of combustion which heats the primary gas. This mixture of gases may have any suitable composition known in the art, but preferably has a composition in accordance with the invention set forth in U.S. Pat. No. 5,348,344.

The burst disk 36 blocks flow of the fluid 42 out of the chamber 40 through the opening 32. The inflator 10 could alternatively include structure different than the burst disk 36 and opening 32, such as a thin-walled portion of the diffuser 30 which is rupturable to provide an opening in the container.

Figure 2:
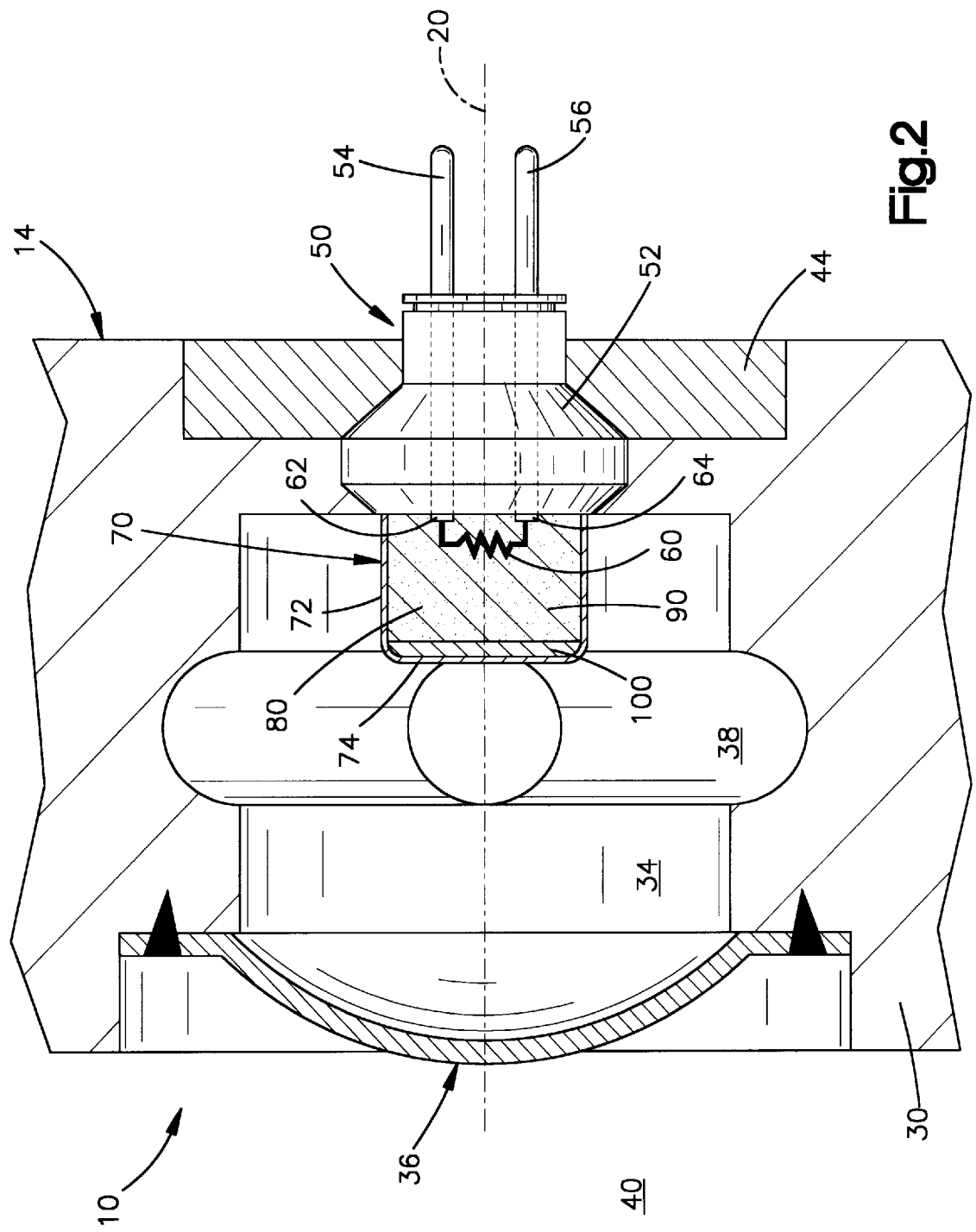
FIG. 2 is an enlarged view of a portion of the inflator of FIG. 1 including the initiator.

The inflator 10 includes a metal retainer 44 secured in the diffuser 30. The retainer secures an initiator 50 in position in the inflator 10. The initiator 50 includes a base illustrated schematically at 52 (FIG. 2). A pair of electrical terminals 54 and 56 extend from the base 52 for engagement by an electrical connector (not shown) of the vehicle.

A resistive element 60 extends between an inner end portion 62 of the first terminal 54 and an inner end portion 64 of the second terminal 56. The resistive element 60 electrically interconnects the first terminal 54 and the second terminal 56. The resistive element 60 is operative to generate heat when an electric current is passed through the resistive element between the first and second terminals 54 and 56 of the initiator 50.

The initiator 50 includes a metal can or cap 70. The cap 70 is a single layer of metal having a cup-shaped configuration including a cylindrical, axially extending side wall 72 and a radially extending end wall 74. The side wall 72 of the cap 70 is centered on the axis 20. The side wall 72 of the cap 70 is sealed to the base 52 of the initiator 50 in a known manner (not shown).

The side wall 72 and end wall 74 of the cap 70 together define a chamber 80 in the cap. A primary charge 90 and a secondary charge 100 are disposed in the chamber 80. The resistive element 60 is also disposed in the chamber 80.

The primary charge 90 is a quantity of ignitable material. The ignitable material is preferably a known pyrotechnic material such as zirconium potassium perchlorate, titanium potassium perchlorate, or boron potassium nitrate, in powder form, which ignites when exposed to the heat generated by the resistive element 60. The cap 70 encloses the ignitable material 90 and maintains the ignitable material in contact with the resistive element 60.

The secondary charge 100 is disposed in a layer along the inside of the end wall 74 of the cap 70. During assembly of the initiator 50, the secondary charge 100 is placed in the empty cap 70 before the primary charge 90 is placed in the cap. The secondary charge 100 is made and assembled separately from the primary charge 90. The secondary charge 100 may be pressed or loose powder.

The secondary charge 100 is thus disposed between the primary charge 90 and the end wall 74 of the cap 70. When the initiator 50 is assembled in the inflator 10, the end wall 74 of the cap 70 is presented toward the burst disk 36. The secondary charge 100 is thus disposed between the primary charge 90 and the burst disk 36 when the initiator 50 is assembled in the inflator 10.

The secondary charge 100 is a quantity of a finely divided active metal used as a fuel and a metal oxide used as an oxidizer (a combination often referred to as "thermite"). An "active" metal is any elemental metal which undergoes a strong exothermic reaction in reducing the metal oxide. Active metals include the alkali metals and the alkaline earth metals, among others. A preferred active metal is aluminum. Other active metals such as magnesium, titanium, or zirconium could be used. A preferred oxidizer is iron oxide. Other materials such as silicon dioxide, chromium oxide, manganese dioxide, cupric oxide or lead oxide could be used as the oxidizer.

The first and second electrical terminals 54 and 56 of the initiator are connected with vehicle electric circuitry indicated schematically at 110 including a power source, which is preferably a vehicle battery and/or a capacitor, and a normally open switch. The switch is part of a sensor which senses a vehicle condition indicating the occurrence of a collision. The collision-indicating condition may comprise, for example, sudden vehicle deceleration that is caused by a collision. If the collision-indicating condition is at or above a predetermined threshold level, it indicates the occurrence of a collision having at least a predetermined threshold level of severity. The threshold level of collision severity is a level at which inflation of the air bag 12 or other vehicle occupant protection device is desired to help protect an occupant of the vehicle.

When the sensor senses a collision-indicating condition at or above the predetermined threshold level, the switch closes and the initiator 50 is energized electrically. An electric current flows between the first and second terminals 54 and 56 of the initiator 50, through the resistive element 60. The resistive element 60 generates heat, which ignites the primary charge 90.

The ignition of the primary charge 90 produces combustion products, including hot gases, and causes an increase in the pressure inside the cap 70. The pressure increase inside the cap 70 causes the cap to rupture. The combustion products of the primary charge 90, and a shock wave, travel away from the base 52 and toward the burst disk 36. The combustion products and the shock wave strike the burst disk 36.

The secondary charge 100 is ignited by the heat of the primary charge 90. The oxidizer in the secondary charge 100 reacts with the fuel in a combustion reaction. The oxidizer is reduced by the fuel, evolving or generating a superheated elemental metal in a liquid form. When aluminum and iron oxide are used as the components of the secondary charge 100, the aluminum reduces the iron oxide, in an exothermic reaction, to form molten iron and aluminum oxide. The metal and metal oxide are selected so that the reaction temperature of the reduction reaction between them is high, with a corresponding high calorific output, and the evolved products should have a high volatility (evaporation temperature).

The molten iron has a temperature typically in the range of 2000–2800° C. The molten iron is propelled by the combustion products of the primary charge into engagement with the burst disk 36. The metal may flow, for example, in a small diameter stream of about one eighth of an inch diameter.

The liquid metal from the secondary charge 100 acts as a projectile and engages the burst disk 36. The burst disk 36 ruptures when it is engaged by the stream of molten metal and by the combustion products of the primary charge. The inflation fluid 42 flows through the ruptured burst disk 36 and through the gas outlet opening 38 in the diffuser 30 to inflate the air bag 12.

The metal of the secondary charge 100 remains molten, while melting the burst disk 36, because of the high temperature of the metal (typically about 2000–2,800° C.) and the small thermal mass of the burst disk (typically about 0.5 mm thickness). The heat of the molten metal helps to weaken the burst disk 36 to enhance the projectile effect of the flowing metal.

After the burst disk 36 is ruptured, the molten metal ignites the fuel gas which is part of the inflation fluid 42 in the container 14. The ignition of the fuel gas raises the pressure and temperature of the primary gas in the container 14. No heat source other than the secondary charge 100 is needed to ignite the fuel gas.

In a second embodiment of the invention, an elemental metal is used as the secondary charge 100. The secondary charge 100 is provided as a disk or similar structure, and is not mixed or compounded with any other elements or materials such as an oxidizer or other ignitable materials. The heat of combustion of the primary charge 90 causes the secondary charge 100 to liquefy. The molten metal is propelled as a projectile by the combustion products of the primary charge 90 into engagement with the burst disk 36, and can help to rupture the burst disk. If there is adequate oxygen present, the elemental metal of the secondary charge 100 will burn rather than melt.

From the above description of the invention, those skilled in the art will perceive improvements, changes and modifications in the invention. For example, the inflation fluid in the container might not include a fuel gas, in which case the molten metal of the secondary charge 100 would serve only to rupture the burst disk. Such improvements, changes and modifications within the skill of the art are intended to be covered by the appended claims.

Having described the invention, we claim:

1. An apparatus for inflating an inflatable vehicle occupant protection device, said apparatus comprising:

a container defining a chamber, said container having a portion, which is rupturable to form an opening in said container, said rupturable portion being a concave burst disk;

a quantity of inflation fluid under pressure in said chamber;

an electrically actuatable initiator connected with said container for rupturing said rupturable portion of said container to enable flow of inflation fluid out of said inflator to inflate the protection device;

said initiator comprising an ignitable primary charge and electrically energizable means for igniting said primary charge;

said initiator further comprising a secondary charge ignitable by said primary charge;

said secondary charge comprising an ignitable metal in solid form which liquefies when ignited by said primary charge;

said primary charge when ignited generating combustion products under pressure which ignite said secondary charge and direct said liquefied metal into engagement with said rupturable portion of said container to help open said rupturable portion of said container; and a gas outlet opening extending between said initiator and said rupturable portion.

2. An apparatus as set forth in claim 1 wherein said secondary charge is disposed between said primary charge and said rupturable portion of said container.

3. An apparatus as set forth in claim 1 wherein said secondary charge comprises a metal in powder form intermixed with an oxidizer.

4. An apparatus as set forth in claim 3 wherein said metal in powder form is aluminum.

5. An apparatus as set forth in claim 4 wherein the oxidizer is iron oxide.

6. An apparatus as set forth in claim 1 wherein said primary charge comprises an ignitable powder which is enclosed by a cap, said secondary charge comprising a layer of ignitable material having a composition different from the composition of said primary charge.

7. An apparatus as set forth in claim 6 wherein said secondary charge comprises thermite.

8. An apparatus as set forth in claim 7 wherein said secondary charge is disposed between said primary charge and said rupturable portion of said container.

9. An apparatus as set forth in claim 1 said secondary charge comprises a layer of elemental metal.

10. An apparatus for inflating an inflatable vehicle occupant protection device, said apparatus comprising:

a container defining a chamber, said container having a portion, which is rupturable to form an opening in said container;

a quantity of inflation fluid under pressure in said chamber; and an electrically actuatable initiator connected with said container for rupturing said rupturable portion of said container to enable flow of inflation fluid out of said inflator to inflate the protection device;

said initiator comprising an ignitable primary charge and electrically energizable means for igniting said primary charge;

said initiator further comprising a secondary charge ignitable by said primary charge;

said secondary charge comprising an ignitable metal in solid form which liquefies when ignited by said primary charge;

said primary charge when ignited generating combustion products under pressure which ignite said secondary charge and direct said liquefied metal into engagement with said rupturable portion of said container to help open said rupturable portion of said container.

* * * * *